(12) United States Patent
Woelfel et al.

(10) Patent No.: US 8,794,648 B2
(45) Date of Patent: Aug. 5, 2014

(54) MOBILE TREADMILL

(75) Inventors: Michael Scott Woelfel, Miamisburg, OH (US); Karl R. Heinze, West Chicago, IL (US)

(73) Assignee: Heron Sales & Marketing Co., Miamisburg, OH (US)

( * ) Notice: Subject to any disclaimer, the term of this patent is extended or adjusted under 35 U.S.C. 154(b) by 124 days.

(21) Appl. No.: 13/432,292

(22) Filed: Mar. 28, 2012

(65) Prior Publication Data

US 2012/0252635 A1   Oct. 4, 2012

Related U.S. Application Data

(60) Provisional application No. 61/468,675, filed on Mar. 29, 2011.

(51) Int. Cl.
 *A63B 22/02* (2006.01)
 *B62K 27/00* (2006.01)
(52) U.S. Cl.
 USPC ........... 280/204; 119/700; 280/202; 280/228; 482/54
(58) Field of Classification Search
 USPC .............. 280/202, 203, 204, 220, 228, 288.4, 280/292, 656, 657; 482/54; 119/700
 See application file for complete search history.

(56) References Cited

U.S. PATENT DOCUMENTS

| | | | |
|---|---|---|---|
| 2,155,684 A | * | 4/1939 | Richards ................. 119/700 |
| 2,506,322 A | * | 5/1950 | Yushak .................. 119/700 |
| 3,709,197 A | | 1/1973 | Moseley |
| 4,095,561 A | | 6/1978 | Ruetenik |
| 4,134,364 A | | 1/1979 | Boncela |
| D257,645 S | | 12/1980 | Ruetenik |
| 4,266,508 A | | 5/1981 | McNulty |
| 4,334,695 A | * | 6/1982 | Ashby ..................... 280/228 |
| 4,721,320 A | | 1/1988 | Creps et al. |
| 4,854,269 A | | 8/1989 | Arntzen |
| 5,033,409 A | | 7/1991 | Sabot |
| D333,887 S | | 3/1993 | Dowler |
| 5,215,037 A | | 6/1993 | Allred |
| 5,277,150 A | | 1/1994 | Rhodes |
| D347,912 S | | 6/1994 | Golden et al. |
| D350,421 S | | 9/1994 | Brubaker |
| 6,148,772 A | | 11/2000 | Keyek-Frannsen |
| 6,347,603 B1 | | 2/2002 | Felger |

(Continued)

FOREIGN PATENT DOCUMENTS

DE   202005008273 U1 *  8/2005

OTHER PUBLICATIONS

"Trail-a-Dog", attached and also available at http://web.archive.org/web/20130715064439/http://trailadog.com/ (Saved to Internet Archive "Wayback Machine" on Jul. 15, 2013).*

(Continued)

*Primary Examiner* — Joseph M Rocca
*Assistant Examiner* — Marc A Scharich
(74) *Attorney, Agent, or Firm* — Thomas E. Lees, LLC

(57) ABSTRACT

A mobile treadmill and a method for powering the mobile treadmill are disclosed. The mobile treadmill includes a trailer, a conveyor, a drive system, and a disconnect. Further, the mobile treadmill is powered by its linear movement on the ground. When the mobile treadmill is moved, wheels on the trailer rotate. The drive system is coupled to one of the wheels and transfers the power from the rotation of the wheel to the conveyor.

14 Claims, 8 Drawing Sheets

(56) References Cited

U.S. PATENT DOCUMENTS

| | | |
|---|---|---|
| 6,722,316 B1 | 4/2004 | Joycey et al. |
| 6,837,186 B1 | 1/2005 | Terao |
| 6,874,448 B1 | 4/2005 | Fleck |
| D558,936 S | 1/2008 | Tamura et al. |
| 7,618,353 B2 | 11/2009 | Papadopoulos et al. |
| 2004/0060521 A1 | 4/2004 | Joycey et al. |
| 2004/0176220 A1 | 9/2004 | Sherman |
| 2007/0022970 A1 | 2/2007 | Newman |
| 2010/0175634 A1 | 7/2010 | Chang et al. |

OTHER PUBLICATIONS

English Machine Transation for DE 20 2005 008 273 U1 (Description, Claims and Abstract).*

Instructables, "Bike Powered Dog Treadmill", http://www.instructables.com/community/Bike-Powered-Dog-Treadmill/, published Oct. 7, 2008.

The Dog Outdoors, "HoundAbout Dog Bicycle Trailer", http://www.thedogoutdoors.com/dog-bicycle-trailer-houndabout.html, downloaded Dec. 23, 2010.

The Red Ferret, "Jog a Dog—doggie treadmill to make your pooch paunchless", http://www.redferret.net/?p=13999, published Apr. 24, 2009.

Honey Spreader, "Mini Manure Spreaders, Manure Spreading Equipment Small Farms Agriculture", http://www.honeyspreaders.com/, downloaded Mar. 20, 2012.

* cited by examiner

MOBILE TREADMILL

CROSS REFERENCE TO RELATED APPLICATIONS

This application claims the benefit of U.S. Provisional Patent Application Ser. No. 61/468,675 filed Mar. 29, 2011, the disclosure of which is hereby incorporated by reference in its entirety.

BACKGROUND

Various aspects of the present invention relate generally to treadmills and more specifically to mobile treadmills that are attached to a vehicle.

Physical exercise is a recognized beneficial bodily activity that can be used for fitness, therapeutic purposes, and health purposes. In order to promote physical exercise, a wide range of exercise devices are commercially available. One such exercise device is a treadmill. A conventional treadmill has a belt that is disposed about a pair of frame-mounted rollers. The rollers are typically spaced apart from each other by an amount in excess to the stride of an expected user of the treadmill. During operation, one of the rollers is driven to a pre-selected speed. Accordingly, a user of the treadmill must walk, jog, or run on the belt, depending upon the belt speed, to maintain a stationary position on the treadmill, thus obtaining physical exercise.

BRIEF SUMMARY

According to aspects of the present invention a mobile treadmill comprises a trailer, a conveyor, a drive system, and a disconnect. The trailer includes a frame, a first wheel coupled to the frame, and a second wheel coupled to the frame opposite the first wheel. The trailer couples to a vehicle such that the first wheel and the second wheel support the frame above the ground, and the first wheel and second wheel generate rotational movement as the trailer moves along the ground under power of a vehicle to which the trailer is coupled. The conveyor includes a first roller, a second roller, and a conveyor belt coupled between the first roller and the second roller. The drive system has an engaged position and a disengaged position and is coupled between the trailer and the conveyor. When the drive system is in the engaged position, the drive system utilizes the rotational movement of the wheel to drive the conveyor. When the drive system is in the disengaged position, the drive system does not drive the conveyor. The disconnect is operative to selectively control the position of the drive system.

According to further aspects of the invention, a method of powering a treadmill is disclosed. The method includes coupling the mobile treadmill to a vehicle, engaging a trailer-driven mechanism to a wheel of the mobile treadmill and causing the vehicle to move linearly, which causes the mobile treadmill to move linearly along the ground.

In this regard, linear movement of the mobile treadmill causes rotation of the wheel of the mobile treadmill, which causes rotation of the trailer-driven mechanism. When the trailer-driven mechanism is engaged to the wheel, rotation of the trailer-driven mechanism causes rotation of a conveyor drive mechanism, which is coupled to the trailer-driven mechanism through a linkage. Rotation of the conveyor drive mechanism causes rotation of a first roller that is coupled to the conveyor drive mechanism, which causes corresponding rotation of a conveyor belt coupled to the first roller.

For simplicity and clarity of illustration, elements shown in the figures have not necessarily been drawn to scale. For example, the dimensions of some of the elements may be exaggerated relative to other elements for clarity of discussion.

DETAILED DESCRIPTION

According to various aspects of the present invention, a mobile treadmill is provided, which includes in general, a trailer having a frame supported by a set of wheels, a conveyor coupled to the frame of the trailer, and a drive system coupled between the trailer and the conveyor. The drive system is operable in one of at least two states. In a first state, designated by an engaged position, the drive system utilizes the rotational movement of one of the wheels to drive the conveyor. In a second state, designated by a disengaged position, the drive system does not drive the conveyor. In illustrative implementations, a disconnect is operative to selectively control the drive system between the engaged and disengaged positions.

In use, the mobile treadmill is towed by a vehicle, such as by a bicycle. As the mobile treadmill is propelled forward under the power of the vehicle, the rotational motion of a wheel on the mobile treadmill, and correspondingly, the linear motion of the mobile treadmill itself, is converted to energy to drive the treadmill conveyor, if the drive system is in the engaged position. However, the rotational motion of the wheel does not drive the conveyor when the drive system is in the disengaged position.

As used herein, "operator" is used to refer to the entity that controls the vehicle and "user" refers to the entity on the treadmill.

The mobile treadmill is suited, for example, to exercise animals when the mobile treadmill is hitched to a bicycle being ridden by a bicycle operator. In an illustrative example, the animal controls the disconnect so as to be able to stop the treadmill conveyor independently of the motion of the bicycle to which the trailer is attached. Moreover, according to certain aspects of the present invention, the speed of the conveyor belt relative to the speed of the attached bicycle may be adjusted so that the conveyor may run faster or slower than the speed of the bicycle.

Figure 1:
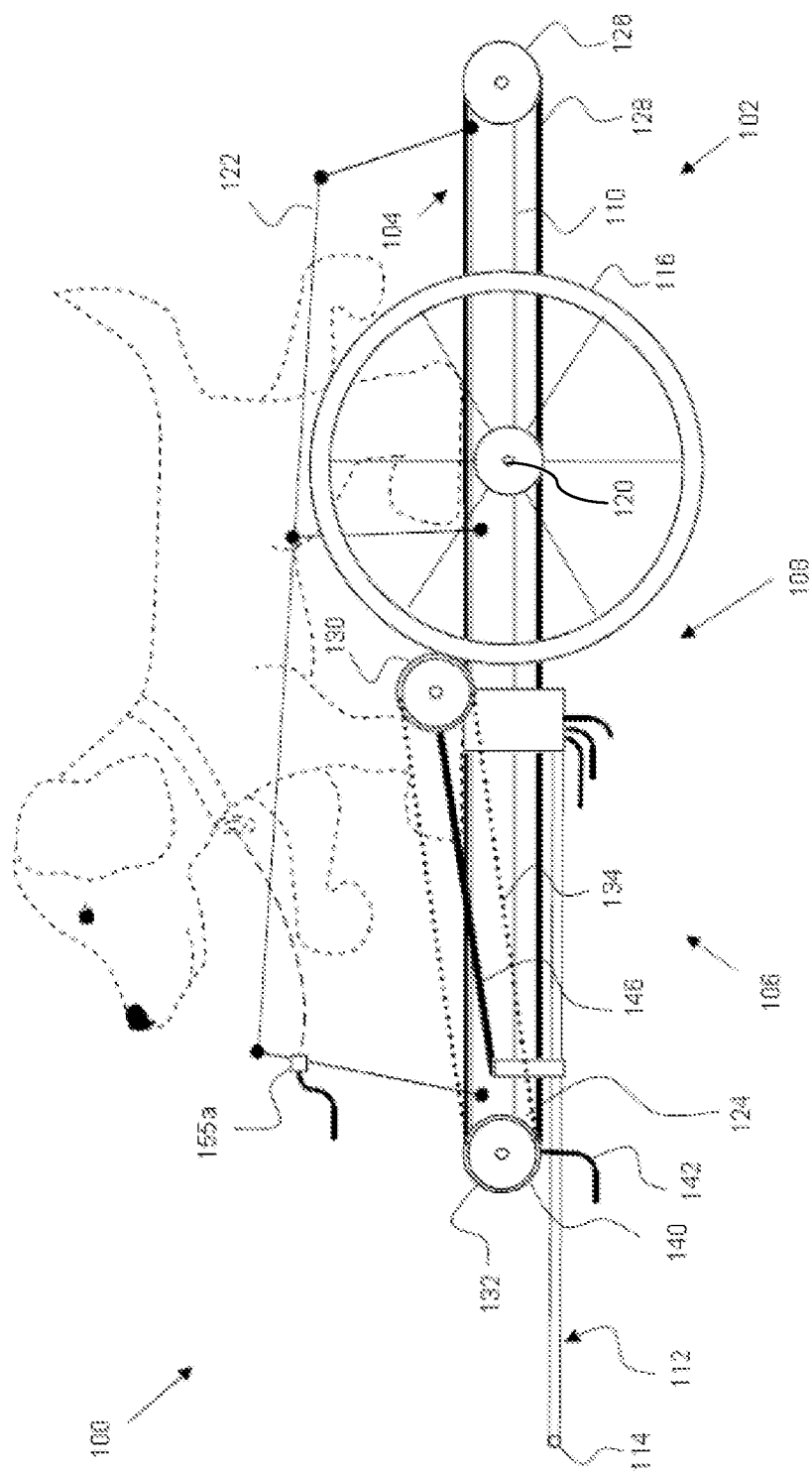
FIG. 1 is a schematic side view of a mobile treadmill according to various aspects of the present invention.

Referring now to the figures and in particular to FIG. 1, a mobile treadmill 100 according to aspects of the present invention, includes a trailer 102, a conveyor 104, a drive system 106 and a disconnect 108, which includes a flexible arm 146.

In the exemplary implementation illustrated, the trailer 102 includes a frame 110 and optionally, a tongue 112. The tongue 112 extends forward of the frame 110 and can alternatively be implemented with tow bar. As another example, the frame 110 may include a hitch receiver that receives a removable drawbar, hitch bar, hitch ball, etc. As illustrated, a hitch 114 connects to the tongue 112 of the frame 110 and provides a mechanism to temporarily connect the mobile treadmill 100 to a vehicle, such as a bicycle, all-terrain vehicle, motorcycle, car, truck, or other vehicle suitable for towing the mobile treadmill 100.

Figure 2:
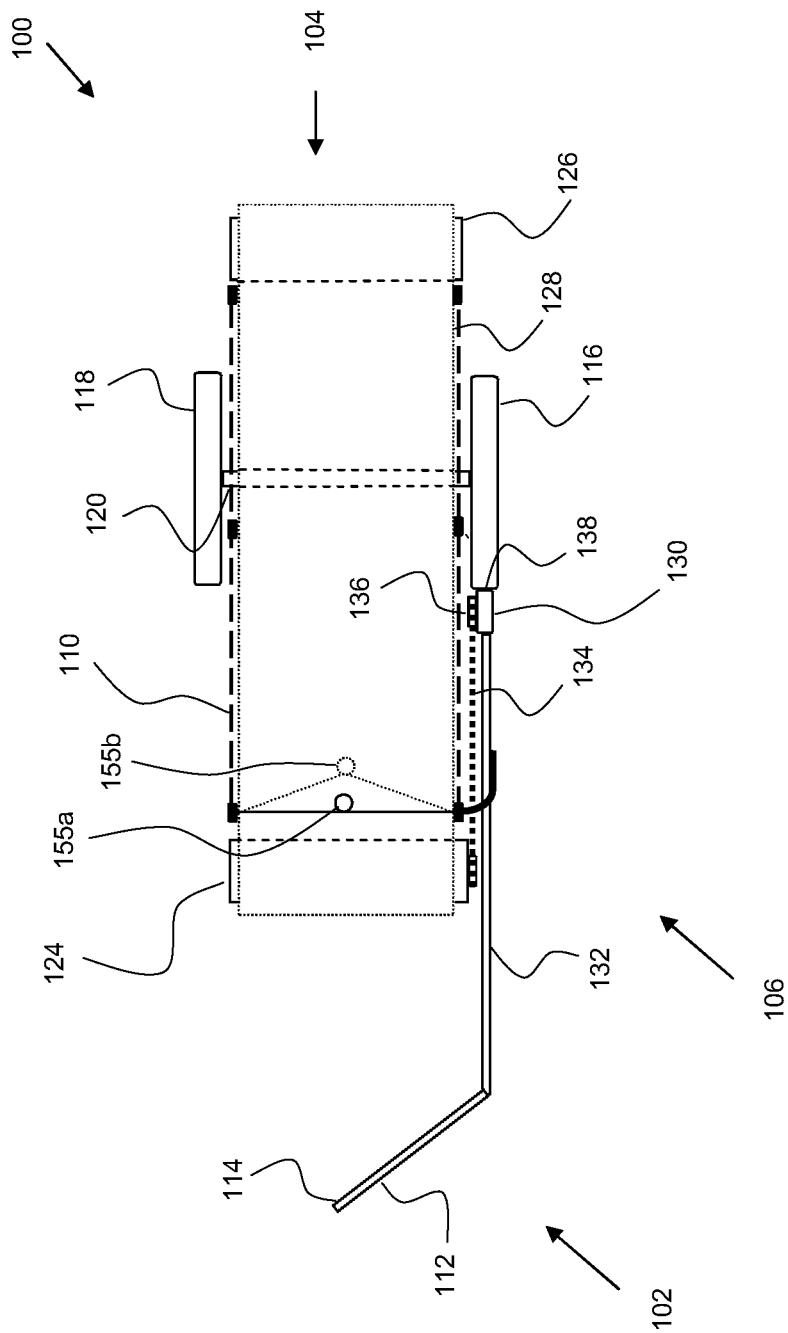
FIG. 2 is a simplified schematic top view of select features of the mobile treadmill of FIG. 1, according to various aspects of the present invention.

Referring to FIG. 2, the front of the frame 110 is towards the hitch 114. Correspondingly, the rear of the frame 110 is at a frame end opposite the hitch 114. A pair of side members extend between the front and rear ends of the frame 110. For instance, according to aspects of the present invention, a first wheel 116 and a second wheel 118 form a pair of wheels mounted to the frame 110, where the pair of wheels share a common axis oriented substantially perpendicular to an imaginary front to rear center line extending centrally through the frame 110. In this regard, the hitch 114 is operative to temporarily couple the trailer 102 to a vehicle such that the wheels 116, 118 support the frame 110 above the ground in cooperation with the hitch 114. For instance, the hitch 114 allows the mobile treadmill 100 to be towed by a vehicle while the trailer 102 rides on the wheels 116, 118. Moreover, the wheels 116, 118 generate rotational movement as the trailer 102 moves along the ground under power of the vehicle to which the trailer 102 is attached.

As depicted in FIG. 2, the first wheel 116 and the second wheel 118 connect to the frame 110 along an axle 120. In other embodiments, the first wheel 116 and a second wheel 118 connect to the frame 110 on separate axles.

Referring back to FIG. 1, the first wheel 116 is a bicycle wheel with spokes; however, in alternative embodiments, the wheels 116, 118 are other types of wheels, such as a solid wheel, a motorcycle wheel, trailer wheel, etc.

Also as illustrated in FIG. 1, the trailer 102 is enclosed by an optional rail 122. The rail 122 can comprise, for instance, supports that extend from the frame 110. The rail 122 may also comprise netting. Also, while illustrated as having a rail 122 that is relatively low (e.g., anticipated to be below the line of sight of an anticipated pet using the mobile treadmill 100) aspects of the invention are not so limited. For instance, the rail 122 may extend vertically, any desired distance. Moreover, while illustrated as having a relatively open rail 122, aspects of the invention are not limited to the illustrated configuration. For instance, it may be desirable to have a relatively closed area (e.g., where it is desirable to block the animal's view of the environment).

In the illustrative exemplary implementation, the conveyor 104 of the mobile treadmill 100 includes a first roller 124, a second roller 126, and a conveyor belt 128. The first roller 124 is located near the front of the frame 110, and the second roller 126 is at the opposite end of the trailer 102, located near the rear of the frame 110. The conveyor belt 128 is an endless loop that is made of any suitable material such as monofilament, polyester, cotton, urethane, etc. In some embodiments, the outside of the conveyor belt 128 is coated with a top coat of a material such as rubber, polyvinyl chloride, etc. to provide traction for an entity running on the conveyor belt 128 (i.e., a user). The conveyor belt 128 is coupled between the first roller 124 and the second roller 126 with enough tension to rotate around both rollers 124, 126 without slipping when at least one of the first and second rollers 124, 126 is driven to rotate as will be described in greater detail herein.

The drive system 106 is coupled between the trailer 102 and the conveyor 104 and can be transitioned between an engaged position and a disengaged position. When the drive system 106 is in the engaged position, the drive system 106 utilizes the rotational movement of the wheel 116 to drive the conveyor 104. Correspondingly, when the drive system 106 is in the disengaged position, the drive system 106 does not drive the conveyor 104.

For instance, the illustrated drive system 106 includes a trailer-driven mechanism 130, a conveyor drive mechanism 132, and a linkage 134. In several embodiments (as shown in FIG. 2), the trailer-driven mechanism 130 includes a trailer-driven member 136 and a trailer-driven surface 138. As an illustrative example, the trailer-driven member 136 can be implemented as a sprocket. As another illustrative example, the trailer-driven member 136 can be implemented as a pulley. The main difference between a sprocket and a pulley herein, is that a sprocket is used when the linkage 134 is implemented as a chain, toothed belt, etc. In this regard, the sprocket has teeth to fit links of a chain or teeth of a toothed belt. Correspondingly, if the linkage 134 is implemented as a belt, the trailer-driven member 136 may be implemented, for example, as a pulley that has a smooth surface and uses tension on a smooth belt to "grip" the belt.

In this illustrative implementation, the trailer-driven mechanism 130 is operative to transition between least two positions: an engaged position and a disengaged position. In the engaged position, the trailer-driven surface 138 of the trailer-driven mechanism 130 frictionally couples to the first wheel 116. In the disengaged position, the trailer-driven surface 138 is not coupled to the first wheel 116. The positions of the trailer-driven mechanism 130 are described in greater detail in reference to the disconnect and FIGS. 4-6 below.

The linkage 134 couples the trailer-driven mechanism 130 to the conveyor drive mechanism 132. As noted above, in some embodiments, the linkage 134 is a belt (either a smooth belt or a toothed belt), while in other embodiments, the linkage 134 is a chain. In an illustrative example, where the linkage 134 is a smooth belt, the trailer-driven mechanism 130 includes the trailer-driven pulley, the conveyor drive mechanism 132 includes a conveyor-driven pulley, and the smooth belt 134 is tensioned between the two pulleys. In another illustrative example where the linkage 134 is a chain or a toothed belt, the trailer-driven mechanism 130 includes the trailer-driven sprocket 136, the conveyor drive mechanism 132 includes a conveyor-driven sprocket, and the spaces between links of the chain 134 or between the teeth of the toothed belt 134 mesh with the teeth of the sprockets 132, 136.

Further, in some embodiments where the mechanisms 130, 132 include sprockets 136, the conveyor drive mechanism includes several sprockets of different radii (not shown) and a shifting mechanism 140. The shifting mechanism 140 is long enough to be accessed by an operator of the vehicle. For instance, the shift mechanism can couple to the handle bar of a bicycle using a suitable cable 142. Thus, the operator of the vehicle may change the ratio of the radius of the trailer-driven sprocket 136 to the radius of the conveyor drive sprocket 132. This ratio controls how fast the conveyor belt rotates around the rollers 124, 126 with respect to the linear speed of the mobile treadmill 100. For instance, in an illustrative example, the shifting mechanism 140 is operable to select between eight (8) speed ratios. However, in practice, any practical number speed ratios may be implemented. In an illustrative example, the vehicle operator (e.g., bicycle rider) can change the ratio of speed of the treadmill to the vehicle, even while riding or otherwise in motion.

Figure 3:
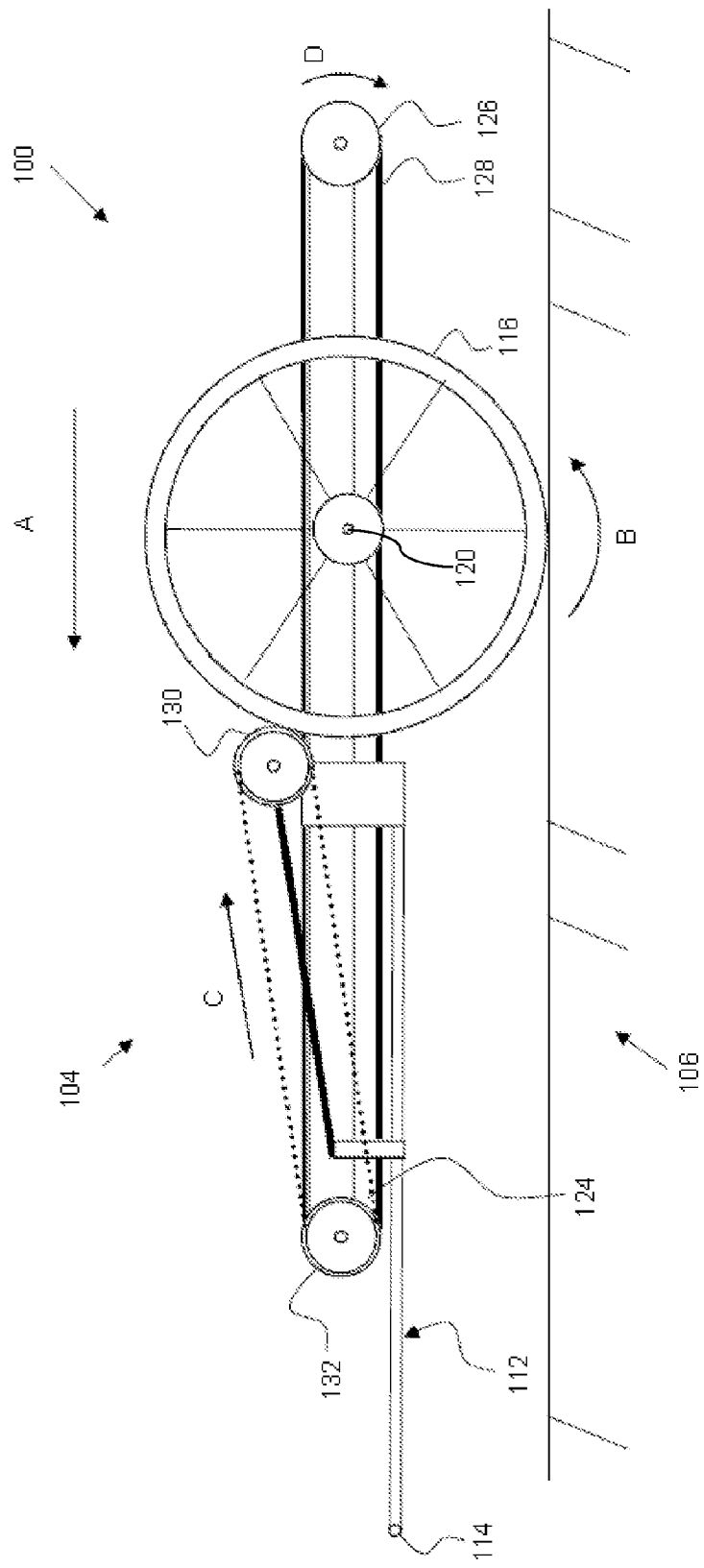
FIG. 3 is a schematic side view of the mobile treadmill of FIGS. 1-2 with arrows indicating motion to illustrate various aspects of powering the mobile treadmill.

Referring now to FIG. 3, a side view of the mobile treadmill 100 is provided with annotated arrows that indicate motion to illustrate various aspects of powering the mobile treadmill 100. Linear movement of the mobile treadmill 100 is utilized to power the conveyor 104. In other words, in the illustrated exemplary implementation, the user on the treadmill does not power the conveyor 104. Rather, the operator of the vehicle provides the linear motion for the mobile treadmill 100, which, in turn, powers the conveyor 104.

For example, the operator couples the mobile treadmill 100 to the rear of a bicycle via the hitch 114. The operator then gets on the bicycle and pedals the bicycle in the direction of arrow A. The mobile treadmill 100 follows behind the bicycle in the same direction (arrow A). This linear motion causes the first wheel 116 to rotate around the axle 120 in a counter-clockwise direction, represented as arrow B. In the exemplary embodiment of FIG. 3, the trailer-driven mechanism 130 is in the engaged position, thus the trailer-driven surface 138 (FIG. 2) is frictionally coupled to the first wheel 116. The counter-clockwise rotation (arrow B) of the first wheel 116 causes the trailer-driven mechanism 130 to rotate in the clockwise direction. The linkage 134 is coupled to the trailer-driven mechanism 130, therefore the linkage 134 also rotates around both the trailer-driven mechanism 130 and the conveyor drive mechanism 132 in a clockwise direction as indicated by arrow C.

The conveyor drive mechanism 132 of the drive system 106 is coaxially coupled to the first roller 124. Thus, when the linkage 134 turns the conveyor drive mechanism 132 in the clockwise direction (arrow C), the first roller 124 also rotates in the clockwise direction. The conveyor belt 128 is coupled between the first roller 124 and the second roller 126, so the rotation of the first roller 124 results in the conveyor belt 128 rotating around the two rollers 124, 126 in the clockwise direction indicated by arrow D. Thus, an exercising entity may run on the conveyor belt 128 as the mobile treadmill 100 is pulled in the linear direction indicated by arrow A.

Figure 4:
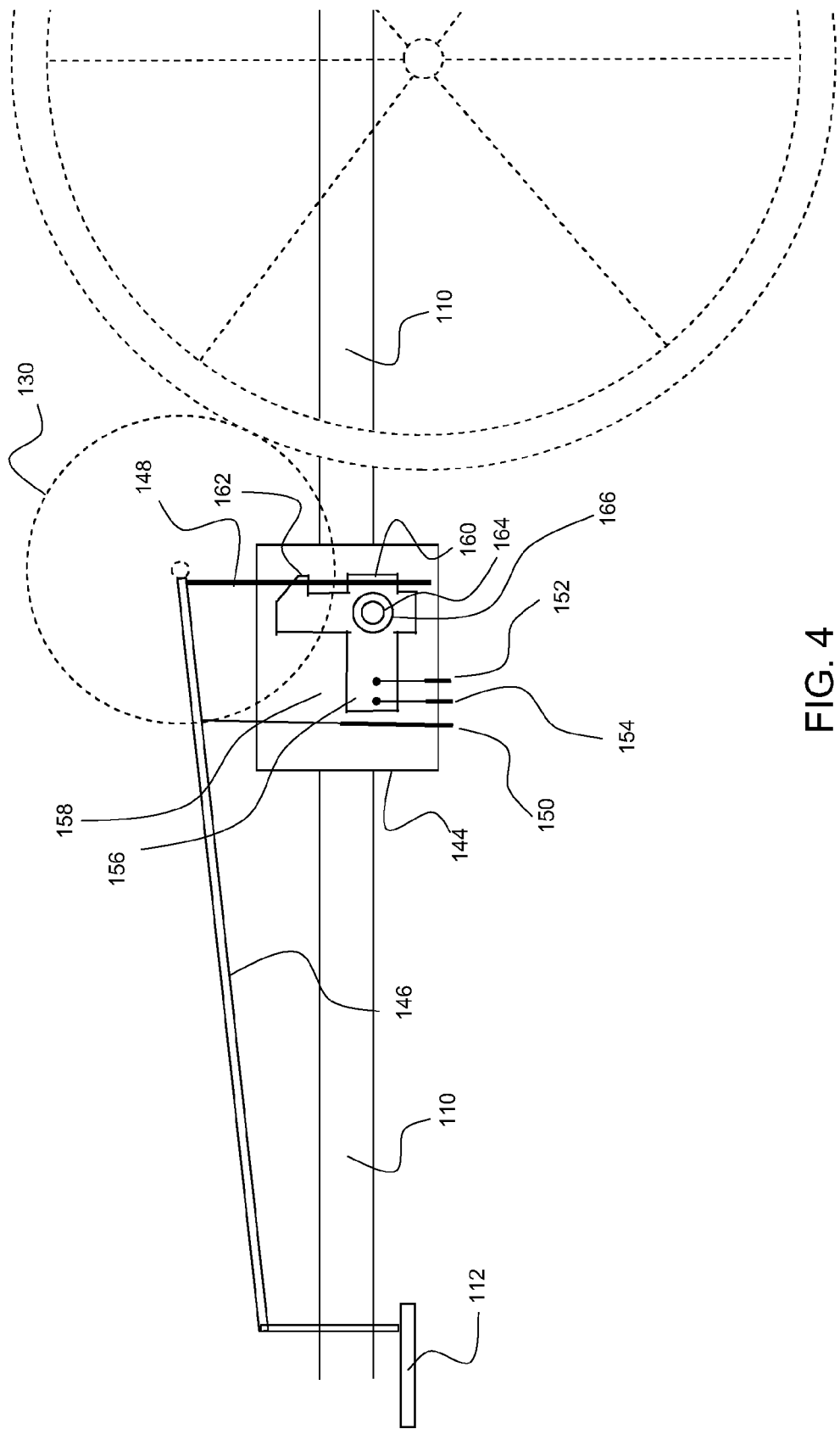
FIG. 4 is a schematic side view of a disconnect of the mobile treadmill of FIGS. 1-3, where the disconnect is in an engaged position, according to various aspects of the present invention.

Referring now to FIG. 4, a side view of various aspects of the disconnect 108 of the treadmill 100 is shown. The disconnect 108 controls whether the trailer-driven mechanism 130 is in the engaged position or the disengaged position. The embodiment shown in FIG. 4 illustrates embodiments where the first wheel 116 does not include a separate drive member. Rather, the wheel itself serves as a drive source. However, the concept of the disconnect works similarly for embodiments where the first wheel 116 includes a distinct, separate drive member, as will be described with reference to FIG. 7, below.

Figure 6:
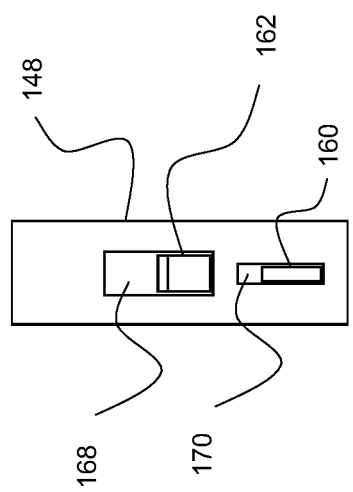
FIG. 6 is a close-up schematic front view of various aspects the disconnect of FIG. 4, while the disconnect is in the engaged position.

The disconnect 108 includes a housing 144, a flexible arm 146 (attached to the frame 110 or tongue 112), and a latch plate 148 (shown in greater detail in FIG. 6). In its engaged state, the flexible arm 146 is positioned such that the trailer-driven device 130 attached at the end of the flexible arm 146 touches the first wheel 116. The housing 144, which is attached to the frame 110 and remains stationary relative to the frame 110, includes links for an engage cable 150, an operator disengage-cable 152, and a user disengage-cable 154.

The two disconnect cables 152, 154 connect to an arm 156 of a latching device 158 inside the housing 144. The other end of the operator disengage-cable 152 goes to an operator's portion of the vehicle (e.g., the handlebars on a bicycle), and the other end of the user disengage-cable 154 goes to a ring (155a, FIG. 2) on the trailer. The engage cable 150 may run between the operator's portion of the vehicle and the flexible arm 146.

The latching device 158 includes the arm 156 (mentioned above), a guide tang 160, and a hook 162. In the engaged position, the hook 162 fits through an upper aperture (FIG. 6) in the latch plate 148 and prevents the flexible arm 146 from disengaging the trailer-driven mechanism 130 from the first wheel 116. However, if the user (e.g., a dog on the treadmill) or the operator (e.g., the bicycle rider) pull on their respective disconnect cables 154, 152, then the latching device 158 rotates around a shaft 164 and disengages the hook 162 from the latch plate 148. With the hook 162 disengaged, the flexible arm 146 pulls the latch plate 148 up and pulls the trailer-driven device 130 away from the first wheel 116.

Figure 5:
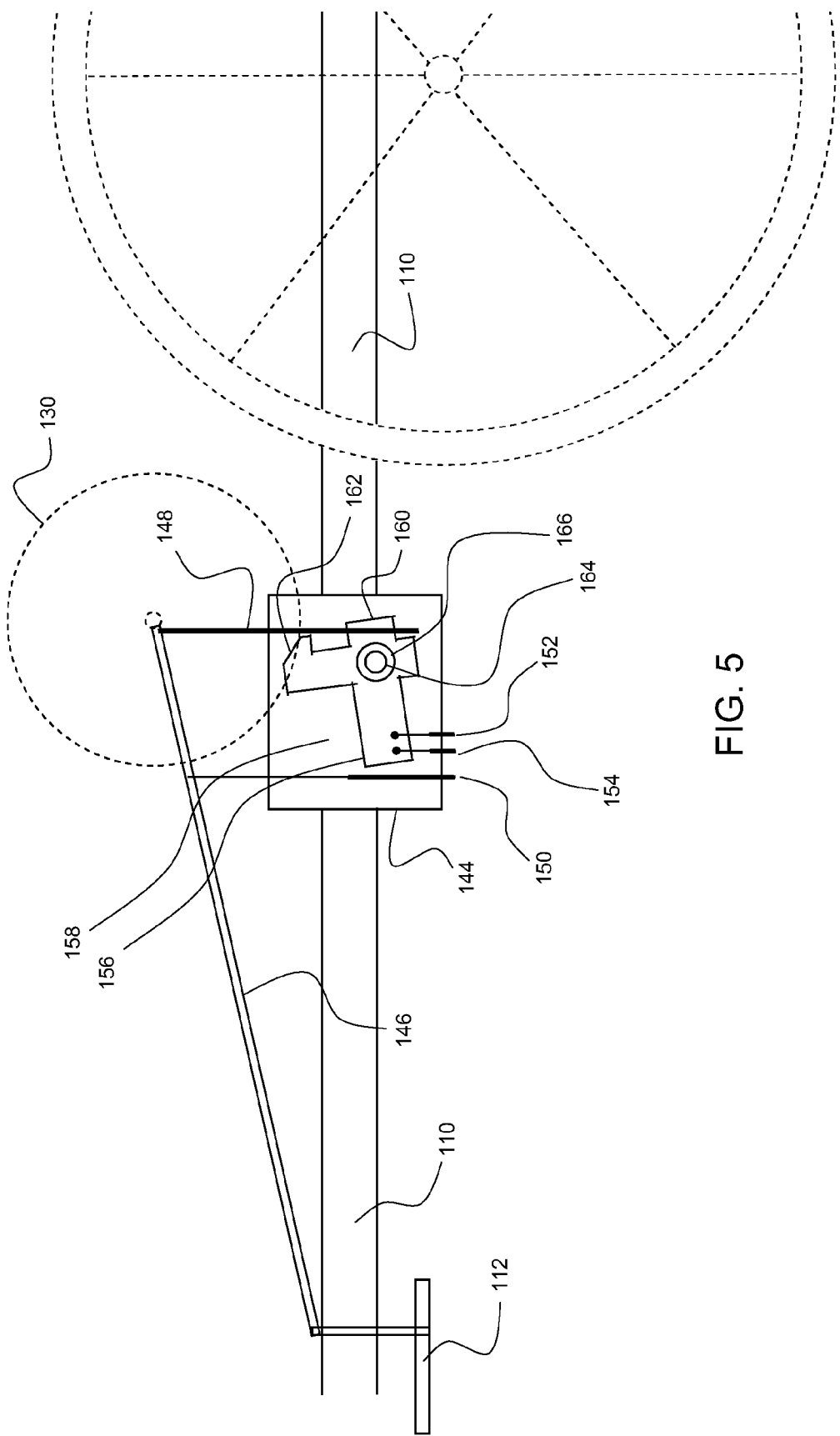
FIG. 5 is a schematic side view of the disconnect of the mobile treadmill of FIGS. 1-4, where the disconnect is in a disengaged position, according to various aspects of the present invention.

FIG. 5 shows the disengaged position. A torsion spring 166 applies a force to try to re-engage the hook 162 in the disengaged position. However, because the latch plate 148 has moved up due to the flexible arm 146, the aperture through which the hook 162 goes when in the engaged position has also moved up, and when the disengage cable is released, the hook 162 does not go through the aperture of the latch plate 148. Thus, the latch plate 148 must be lowered for the hook 162 to re-engage the system. To accomplish this, the operator pulls the engage cable 150, which lowers the flexible arm 146, which in turn lowers the latch plate 148. Then, the hook 162 engages the latch plate 148 because of the torsion spring 166, and the system is in the engaged position represented in FIG. 4.

FIG. 6 illustrates a front view of the latch plate 148 in the engaged position. The latch plate 148 includes a upper aperture 168 and a lower aperture 170. When the hook 162 is engaged, the hook 162 is through the upper aperture 168 and the guide tang 160 is through the lower aperture 170. In the disengaged position, the hook 162 is released from the upper aperture 168, but the guide tang 160 remains through the lower aperture 170. Thus, when the latch plate 148 is lowered to re-engage, the guide tang 160 prevents the latch plate 148 from moving horizontally and helps ensure that the hook 162 re-engages through the upper aperture 168.

Other embodiments of the disconnect 108 may be used. For example, the trailer-driven mechanism may be located below the first wheel 116, as opposed to above the first wheel 116 as is depicted in the figures. Another example of the disconnect 108 is shown in U.S. Provisional Application Ser. No. 61/468, 675 filed Mar. 29, 2011, which has already been incorporated by reference above.

Figure 7:
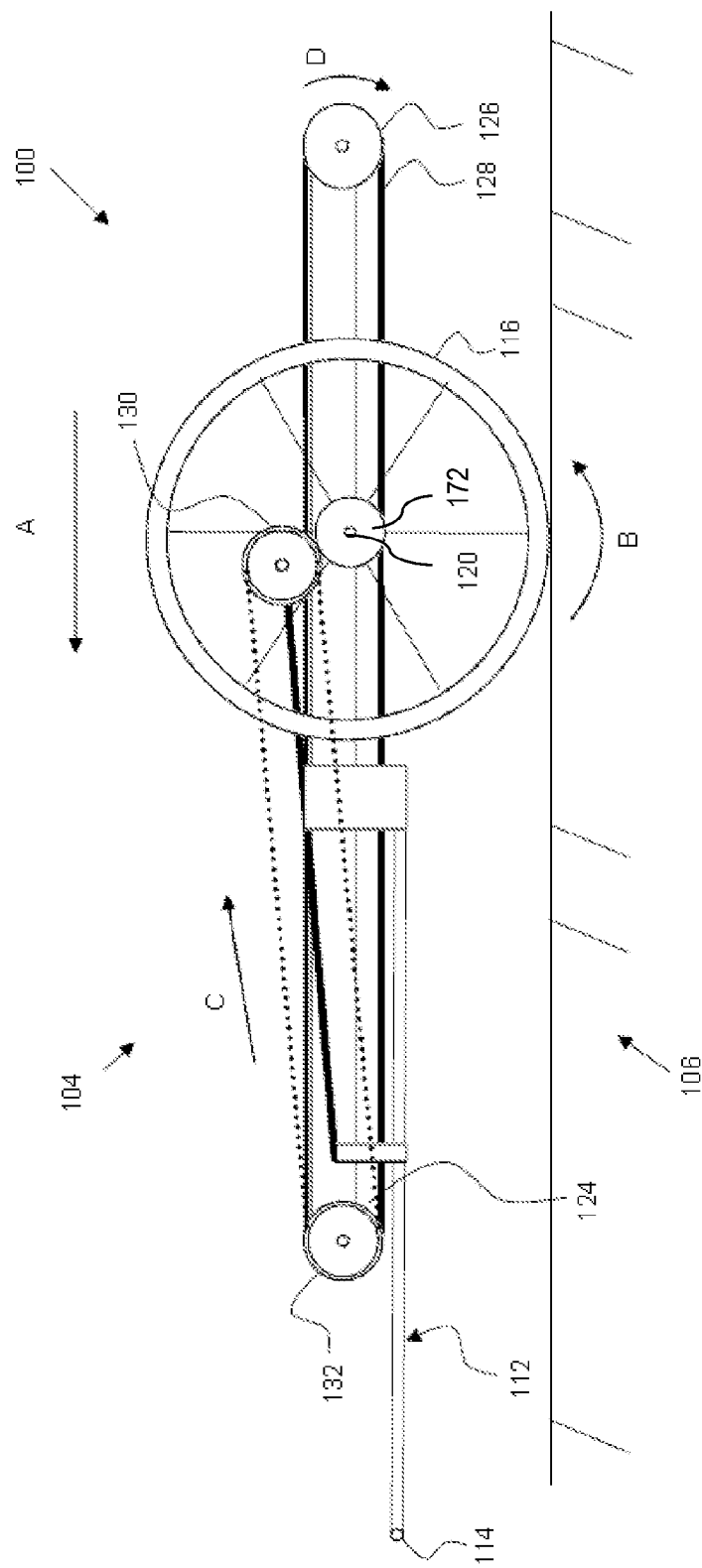
FIG. 7 is a schematic side view of an another exemplary implementation of a mobile treadmill according to various aspects of the present invention.

Referring to FIG. 7, a mobile treadmill 100 is illustrated according to further aspects of the present invention. The mobile treadmill 100 in FIG. 7 is analogous to, and can include features as set out in greater detail herein with regard to FIGS. 1-5 except that the trailer-driven surface 138 couples to a drive member 172 of the first wheel 116, as opposed to the illustrative embodiments of FIGS. 1-5, where the trailer-driven mechanism couples to a tire of the first wheel 116. The principle of operation of the disconnect 108 is similar for embodiments with or without a drive member 172.

Figure 8:
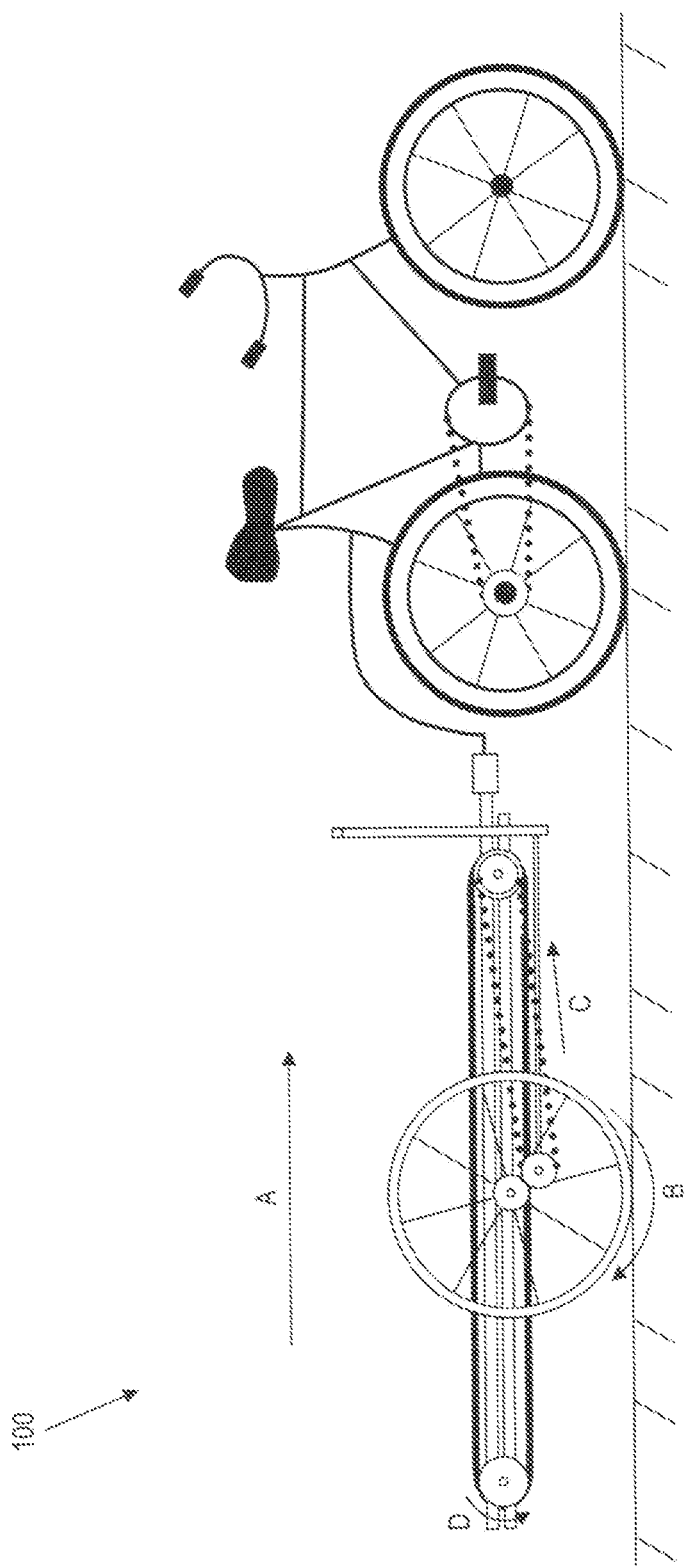
FIG. 8 is a schematic side view of the mobile treadmill coupled to a bicycle, according to various aspects of the invention.

Referring to FIG. 8, the mobile treadmill 100 is illustrated as being coupled to a bicycle, according to various aspects of the invention. As mentioned above, in several embodiments the mobile treadmill 100 includes a hitch to temporarily couple the mobile treadmill 100 to a vehicle. However, in other embodiments, the mobile treadmill 100 is integrated into the vehicle itself. The embodiment of FIG. 8 illustrated the mobile treadmill 100 integrated with a bicycle, but in other embodiments, the mobile treadmill 100 is integrated with other vehicles such as a motorcycle, all-terrain vehicle, car, truck, or other vehicle suitable for towing the mobile treadmill 100.

The mobile treadmill 100 allows an operator to ride a vehicle and move the mobile treadmill 100 around. That movement powers the conveyor 104 of the mobile treadmill 100.

An exemplary process for using the mobile treadmill attached to a bicycle to exercise a dog is as follows. The operator places the dog on the conveyor 104 and attaches the dog's leash to the ring 155*a* (FIG. 2). In some embodiments, the operator can place the dog in a harness (not shown) to prevent the dog from moving around too much or jumping out of the treadmill.

The disconnect 108 starts out in the disengaged position and the operator starts to ride the bicycle. After a while, the operator engages the disconnect 108 and the conveyor 104 starts to move, and the dog runs. The operator can adjust the speed of the conveyor 104 relative to the forward motion of the bicycle by changing the gear ratio of the gear box 140.

When the dog gets tired, it pulls back on its leash (or simply lags behind), which is connected to the ring 155*a* (FIG. 2) such that the ring moves to a second position 155*b* (FIG. 2), which pulls the user disconnect cable 154. The trailer-driven mechanism 130 disengages and the conveyor 104 is in a trailering mode (i.e., the conveyor is stationary and the dog can rest). When the operator wants to get the dog more exercise, the operator re-engages the disconnect 108 and the conveyor 104 starts moving again.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," "including," "having," "has," or any combination thereof when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. Aspects of the invention were chosen and described in order to best explain the principles of the invention and the practical application, and to enable others of ordinary skill in the art to understand the invention for various embodiments with various modifications as are suited to the particular use contemplated.

What is claimed is:

1. A mobile treadmill comprising:
    a trailer comprising:
        a frame with a width,
        a first wheel coupled to the frame, and
        a second wheel coupled to the frame opposite the first wheel,
        wherein the trailer couples to a vehicle such that the first wheel and the second wheel support the frame above the ground, and the first wheel and second wheel generate rotational movement as the trailer moves along the ground under power of the vehicle to which the trailer is coupled;
    a conveyor coupled to the frame, the conveyor comprising:
        a first roller,
        a second roller, and
        a conveyor belt with a width approximately the width of the frame, the conveyor belt coupled between the first roller and the second roller;
    a drive system having an engaged position and a disengaged position, the drive system coupled between the trailer and the conveyor, wherein:
        when the drive system is in the engaged position, the drive system utilizes the rotational movement of the first wheel to drive the conveyor, and
        when the drive system is in the disengaged position, the drive system does not drive the conveyor; and
    a disconnect operative to selectively place the drive system into the engaged position or the disengaged position, wherein the disconnect comprises a treadmill user disengage element operable for a treadmill user to place the drive system into the disengaged position.

2. The mobile treadmill of claim 1, wherein the drive system comprises:
    a conveyor drive mechanism coupled to the first roller of the conveyor;
    a trailer-driven mechanism coupled to the first wheel of the trailer; and
    a linkage coupled between the conveyor drive mechanism and the trailer-driven mechanism.

3. The mobile treadmill of claim 2, wherein:
    the conveyor drive mechanism comprises a conveyor drive pulley;
    the trailer-driven mechanism comprises a trailer-driven pulley; and
    the linkage is a belt coupled between the conveyor drive pulley and the trailer-driven pulley.

4. The mobile treadmill of claim 3, wherein the trailer-driven mechanism further comprises a trailer-driven surface that is selectively coupled to the first wheel of the trailer.

5. The mobile treadmill of claim 4, wherein the first wheel of the trailer comprises a drive member that is selectively coupled to the trailer-driven surface of the trailer-driven mechanism.

6. The mobile treadmill of claim 2, wherein:
    the conveyor drive mechanism comprises a conveyor drive sprocket;
    the trailer-driven mechanism comprises a trailer-driven sprocket; and
    the linkage is a chain coupled between the conveyor drive sprocket and the trailer-driven sprocket.

7. The mobile treadmill of claim 6, wherein the trailer-driven mechanism further comprises a trailer-driven surface that is selectively coupled to the first wheel of the trailer.

8. The mobile treadmill of claim 7, wherein the first wheel of the trailer comprises a drive member that is selectively coupled to the trailer-driven surface of the trailer-driven mechanism.

9. The mobile treadmill of claim 6, wherein the conveyor drive sprocket comprises a plurality of sprockets and a shifting mechanism operative to allow an operator to select which one of the plurality of sprockets of the conveyor drive sprocket is coupled to the trailer-driven sprocket via the chain.

10. The mobile treadmill of claim 2, wherein the disconnect further comprises:

a housing including a latching device comprising:
  an arm, a hook, a guide tang, and a torsion spring;
a flexible arm coupled to the trailer-driven mechanism; and
a latch plate comprising a first aperture and a second aperture,
wherein
  the hook fits into the first aperture of the latch plate;
  the guide tang fits into the second aperture of the latch plate;
  the drive system is in the engaged position when the hook is engaged in the first aperture of the latch plate; and
  the drive system is in the disengaged position when the hook is not engaged in the first aperture of the latch plate.

11. The mobile treadmill of claim 10, wherein the disconnect further comprises:
an engage cable coupled to the flexible arm, the engage cable operative to transition the trailer-driven mechanism from the disengaged position to the engaged position by moving the latch plate such that the first aperture aligns with the hook and the torsion spring forces the hook through the first aperture.

12. The mobile treadmill of claim 10, wherein the disconnect further comprises a vehicle operator disengage-cable coupled to the flexible arm of the latching device, the vehicle operator disengage-cable operative to disengage the hook from the first aperture of the latch plate.

13. The mobile treadmill of claim 10, wherein the treadmill user disengage element is a treadmill user disengage-cable coupled to the flexible arm of the latching device, the treadmill user disengage-cable operative to disengage the hook from the first aperture of the latch plate.

14. The mobile treadmill of claim 1, further comprising a hitch coupled to the frame, wherein the hitch is operative to temporarily couple the trailer to the vehicle.

* * * * *